United States Patent
Trube et al.

(10) Patent No.: US 6,469,277 B1
(45) Date of Patent: Oct. 22, 2002

(54) METHOD AND APPARATUS FOR HYBRID WELDING UNDER SHIELDING GAS

(75) Inventors: Stefan Trube, Herborn-Guntersdorf; Ernst Miklos, Tutzing; Jürgen Scholz, München, all of (DE)

(73) Assignee: Linde Gas Aktiengesellschaft, Hollriegelskreuth (DE)

( * ) Notice: Subject to any disclaimer, the term of this patent is extended or adjusted under 35 U.S.C. 154(b) by 45 days.

(21) Appl. No.: 09/664,357

(22) Filed: Sep. 18, 2000

(30) Foreign Application Priority Data

Sep. 16, 1999 (DE) .......................... 199 44 466

(51) Int. Cl.⁷ .............................................. B23K 9/02
(52) U.S. Cl. ............................ 219/137 R; 219/121.63; 219/121.64; 219/136
(58) Field of Search .................... 219/130.4, 121.63, 219/121.64, 124.22, 136, 137 R

(56) References Cited

U.S. PATENT DOCUMENTS

| | | | |
|---|---|---|---|
| 4,390,774 A | * | 6/1983 | Steen et al. ............. 219/121.63 |
| 5,821,493 A | * | 10/1998 | Beyer et al. ............ 219/121.64 |

FOREIGN PATENT DOCUMENTS

| | | | |
|---|---|---|---|
| DE | 4334568 | | 4/1995 |
| JP | 51-79654 | * | 7/1976 .............. 219/137 R |

* cited by examiner

Primary Examiner—Clifford C. Shaw
(74) Attorney, Agent, or Firm—Crowell & Moring LLP

(57) ABSTRACT

A hybrid welding from a combination of laser beam welding with gas-shielded welding by electric arc uses at least two electrodes are used. The electrodes can be flooded by a common shielding gas curtain or separately or in groups. The hybrid welding increases the possibility of influencing the welding process and especially provides improved possibilities for automation.

52 Claims, 1 Drawing Sheet

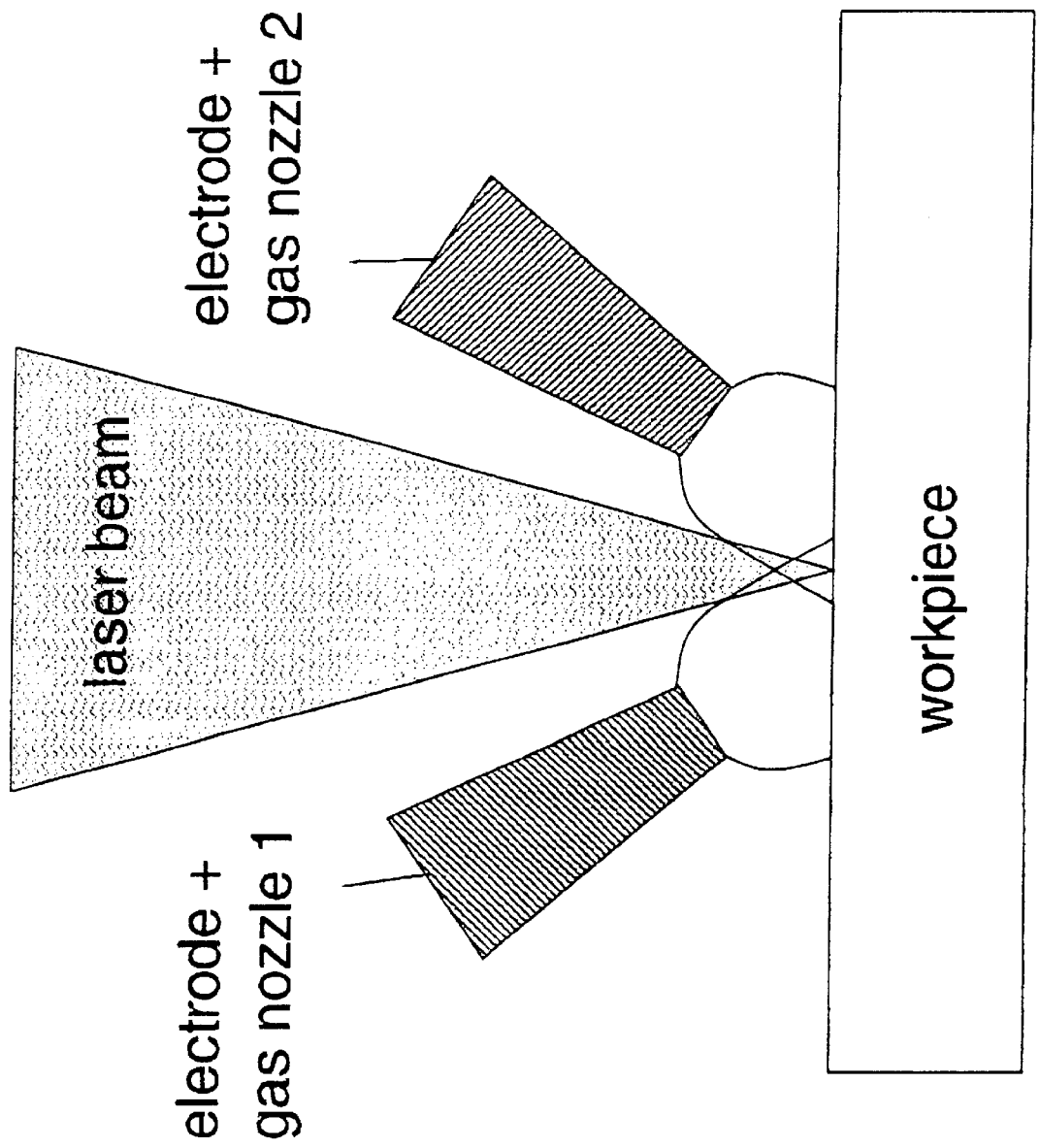

METHOD AND APPARATUS FOR HYBRID WELDING UNDER SHIELDING GAS

BACKGROUND AND SUMMARY OF THE INVENTION

This application claims the priority of German patent document No. 199 44 466.8, filed Sep. 16, 1999, the disclosure of which is expressly incorporated by reference herein.

The present invention relates to a method for gas-shielded hybrid welding by arc and laser beam. At least one focused laser beam is directed against a relatively moving workpiece, and an electric arc is produced by at least one electrode under a shielding gas.

The present invention furthermore relates to an apparatus for gas-shielded hybrid welding by laser beam and arc. The apparatus comprises a laser welding head for directing at least one focused laser beam against the workpiece; a welding torch for producing an electric arc by an electrode; means for supplying a shielding gas; and means for producing a relative movement between the laser welding head and the burner on the one hand and the workpiece on the other.

Laser beam and arc welding are widely employed in the field of industrial manufacturing. Each method has specific applications which are characterized by the physical processes of the delivery of energy to a material and the flows of energy produced.

Laser beam welding is characterized by low input of energy into the material and high working speeds, resulting in a comparatively narrow area affected by heat and a great ratio of seam depth to seam width. However, in laser beam welding the bridging of gaps that can be achieved is poor due to the small diameter of the laser beam.

The arc welding process produces low working speeds on account of the substantially lower energy density. Furthermore, the focal spot of the arc on the workpiece surface is larger than that of the laser beam. As a result, wider seams are produced by arc welding than by laser beam welding, so that the gap-bridging ability is greater for a comparable weld depth.

For some time, attempts have been made to combine laser beam welding with arc welding. Basically two variant methods are conceivable. The first possibility is serial processing, wherein the laser beam and arc are separate in time and place on the workpiece.

The second variant method is called "hybrid welding," wherein the laser beam and arc act simultaneously in an interaction zone (plasma and molten metal) and mutually assist one another. The arc may be produced by gas metal arc welding (GMAW); tungsten inert gas welding (TIG); or plasma arc welding (PAW).

The present invention is directed to hybrid welding under a shielding gas, in which the laser beam and the arc strike the workpiece substantially at the same place. In hybrid welding, the arc delivers heat to the material in an upper seam area in addition to the laser beam, which leads to a wineglass shape in the seam. The mutual influence of the processes permits different appearances and alignments depending on the laser welding or arc welding process and the process parameters employed. The thermal stress on the workpiece in hybrid welding can be kept relatively small as it can in laser welding. The character of the particular process used in hybrid welding will predominate depending on the ratio of the power inputs from the laser beam or the arc.

Hybrid welding with the use of shielding gases is described in several variants, for example, in German patent document DE 43 34 568 A1.

In the known combinations of laser and gas-shielded welding methods in hybrid technology, there are few possibilities for influencing the welding process. In particular, due to the asymmetrical arrangement of the individual electrode and the laser beam, there are limited possibilities for automation.

Any departures from the relative positions of the two energy sources to one another and/or to the workpiece limit the repeatability of the welding process or result in unequal quality.

The present invention therefore is addressed to the problem of finding a method and an apparatus, through which a better possibility for influencing the welding process is provided, and especially an improved possibility for automation. Furthermore, a gas-shielded hybrid welding of good quality due to its repeatability and reliability is made possible.

This problem is solved by the present invention in that at least two electrodes are used.

Other objects, advantages and novel features of the present invention will become apparent from the following detailed description of the invention when considered in conjunction with the accompanying drawings.

BRIEF DESCRIPTION OF THE DRAWING

The sole FIGURE schematically shows hybrid welding under a shielding gas using two electrodes.

DETAILED DESCRIPTION OF DRAWING

By increasing the number of electrodes to two or more electrodes, the possibility of influencing the welding process is substantially improved. For one thing, a better and repeatable seam quality is achieved, which manifests itself in a better penetration geometry and in a better seam surface. For another thing, the separate potentials permit a specific heat input. Both a directional and a nondirectional input of energy is possible.

In the scope of the present invention, consumable and/or non-consumable electrodes can be used. When consumable electrodes are used, higher ablation rates are possible. Also, different additive materials can be used. Fundamentally, consumable and non-consumable electrodes can be combined in any way with one another within the invention.

As shown in the FIGURE, each electrode may be flooded with a separate curtain of shielding gas. Alternatively, several electrodes are flooded with one common shielding gas curtain. It is also possible for all electrodes to be flooded with one common shielding gas curtain.

All of the known shielding gases or shielding gas mixtures can be used as the gases, and process gases or process gas mixtures can be fed in. Electrodes can be combined in groups in the shielding gas.

In an embodiment of the present invention, the electrodes are connected to an electrical potential and/or to separate electrical potentials. In particular, groups of electrodes can be connected to one electrical potential.

In an embodiment of the present invention, the electrodes are arranged in the same and/or different planes perpendicular to the laser beam axis and/or parallel to the workpiece surface. The term "planes parallel to the workpiece surface" is to be understood in the case of uneven workpiece surfaces to mean planes substantially parallel to the workpiece surface, in which the directional vector of the preferred direction of the relative movement lies. In particular, the electrodes can be arranged in planes at different distances from the working point on the workpiece surface. The penetration profile can be influenced by the arrangement of the electrodes.

The arc, or an arc, can burn between one electrode or a plurality of electrodes and the workpiece and/or between electrodes.

The term, "focused laser beam," is to be understood within the scope of the present invention to refer to a laser beam substantially focused on the workpiece surface. In addition to the laser beam focused substantially on the workpiece surface in the predominantly used method, the present invention can also find application in the rarely used variant using an out-of-focus beam on the workpiece surface.

The present invention is not fundamentally limited to the use of special kinds of lasers. Suitable for laser beam welding are chiefly $CO_2$ lasers, Nd:YAG lasers or also diode lasers, especially high-power diode lasers (HDL).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for gas-shielded hybrid welding by laser beam and arc, comprising:
    directing at least one focused laser beam against a moving workpiece;
    producing a first electric arc by a first electrode under a shielding gas;
    producing a second electric arc by a second electrode under a shielding gas; and
    simultaneously hybrid welding the workpiece by each of the focused laser beam, the first electric arc, and the second electric arc in a single interaction zone of plasma and molten metal.

2. A method of claim 1, wherein the first and second electrodes are consumable or non-consumable electrodes.

3. A method of claim 1, wherein each electrode is flooded by a separate shielding-gas curtain.

4. A method of claim 1, wherein a plurality of electrodes are flooded by a common shielding-gas curtain.

5. A method of claim 4, wherein all electrodes are flooded by a common shielding-gas curtain.

6. A method of claim 1, wherein the first and second electrodes are connected to one electrical potential.

7. A method of claim 1, wherein the first and second electrodes are connected to separate electrical potentials.

8. A method of claim 1, wherein a group of electrodes is connected to a same electrical potential.

9. A method of claim 1, wherein the first and second electrodes are arranged in a same plane perpendicular to a laser beam axis.

10. A method of claim 1, wherein the first and second electrodes are arranged in a same plane parallel to a workpiece surface.

11. A method of claim 1, wherein the first and second electrodes are arranged in different planes perpendicular to a laser beam axis.

12. A method of claim 1, wherein the first and second electrodes are arranged in different planes parallel to a workpiece surface.

13. A method of claim 1, wherein an arc burns between one electrode or a plurality of electrodes and the workpiece.

14. A method of claim 1, wherein an arc burn between the first and second electrodes.

15. A method of claim 1, further comprising:
    producing additional electric arcs by additional electrodes under a shielding gas; and
    simultaneously hybrid welding the workpiece by each of the focused laser beam, the first electric arc, the second electric arc, and the additional electric arcs in a single interaction zone of plasma and molten metal.

16. An apparatus for gas-shielded hybrid welding by laser beam and arc, comprising:
    a laser welding head for delivering at least one focused laser beam to a a workpiece;
    a welding torch for producing a first electric arc by a first electrode and a second electric arc by a second electrode;
    means for feeding a shielding gas; and
    means for producing a relative movement between the laser welding head and the workpiece;
    Wherein the at least one focused laser beam, the first electric arc, and the second electric arc all simultaneosly weld the workpiece in a single interaction zone of plasma and molten metal.

17. An apparatus of claim 16, wherein the first and second electrodes are consumable or non-consumable electrodes.

18. An apparatus of claim 16, wherein the means for feeding shielding gas is arranged to provide that each electrode is flooded by a separate shielding-gas curtain.

19. An apparatus of claim 16, wherein the means for feeding shielding gas is arranged to provide that a plurality of electrodes are flooded by a common shielding-gas curtain.

20. An apparatus of claim 16, wherein the first and second electrodes are connected to one electrical potential or to separate electrical potentials.

21. An apparatus of claim 16, wherein a group of electrodes is connected to one electrical potential.

22. An apparatus of claim 16, wherein the electrodes are arranged in same or different planes perpendicular to a laser beam axis.

23. An apparatus of claim 16, wherein the electrodes are arranged in same or different planes perpendicular to a laser beam axis.

24. An apparatus of claim 16, wherein in arc burns between one electrode or a plurality of electrodes and the workpiece.

25. An apparatus of claim 16, wherein an arc burns between the first and second electrodes.

26. An apparatus of claim 16, wherein the welding torch produces additional electric arcs by additional electrodes and further wherein the at last one focused laser beam, the first electric arc, the second electric arc, and the additional electric arcs all simultaneously weld the workpiece in a single interaction zone of plasma and molten metal.

27. A method for gas-shielded hybrid welding by laser beam and arc, comprising:
    directing at least one focused laser beam against a workpiece;
    producing a first electric arc by a first electrode;
    producing a second electric arc by a second electrode; and
    simultaneously hybrid welding the workpiece by each of the focused laser beam, the first electric arc, and the second electric arc in a single interaction zone of plasma and molten metal.

28. A method of claim 27, wherein the first and second electrodes are consumable or non-consumable electrodes.

29. A method of claim 27, wherein each electrodes is flooded by a separate shielding-gas curtain.

30. A method of claim 27, wherein a plurality of electrodes are flooded by a common shielding-gas curtain.

31. A method of claim 30, wherein all electrodes are flooded by a common shielding-gas curtain.

32. A method of claim 27, wherein the first and second electrodes are connected to one electrical potential.

33. A method of claim 27, wherein the first and second electrodes are connected to separate electrical potentials.

34. A method of claim 27, wherein a group of electrodes is connected to a same electrical potential.

35. A method of claim 27, wherein the first and second electrodes are arranged in a same plane perpendicular to a laser beam axis.

36. A method of claim 27, wherein the first and second electrodes are arranged in a same plane parallel to a workpiece surface.

37. A method of claim 27, wherein the first and second electrodes are arranged in different planes perpendicular to a laser beam axis.

38. A method of claim 27, wherein the first and second electrodes are arranged in different planes parallel to a workpiece surface.

39. A method of claim 27, wherein an arc burns between one electrode or a plurality of electrodes and the workpiece.

40. A method of claim 27, wherein an arc burns between the first and second electrodes.

41. A method of claim 27, further comprising:
producing additional electric arcs by additional electrodes; and
simultaneously hybrid welding the workpiece by each of the focused laser beam, the first electric arc, the second electric arc, and the additional electric arcs in a single interaction zone of plasma and molten metal.

42. An apparatus for gas-shielded hybrid welding by laser beam and arc, comprising:

a laser welding head for delivering at least one focused laser beam to a workpiece;
a welding torch for producing a first electric arc by a first electrode and a second electric arc by a second electrode; and
wherein the at least one focused laser beam, the first electric arc, and the second electric arc all simultaneously weld the workpiece in a single interaction zone of plasma and molten metal.

43. An apparatus of claim 42, wherein the first and second electrodes are consumable or non-consumable electrodes.

44. An apparatus of claim 42, wherein each electrode is flooded by a separate shielding-gas curtain.

45. An apparatus of claim 42, wherein each electrode is flooded by a common shielding-gas curtain.

46. An apparatus of claim 42, wherein the first and second electrodes are connected to one electrical potential or to separate electrical potentials.

47. An apparatus of claim 42, wherein a group of electrodes is connected to on e electrical potential.

48. An apparatus of claim 42, wherein the electrodes are arranged in same or different planes perpendicular to a laser beam axis.

49. An apparatus of claim 42, wherein the electrodes are arranged in same or different planes parallel to a workpiece surface.

50. An apparatus of claim 42, wherein an arc burns between one electrode or a plurality of electrodes and the workpiece.

51. An apparatus of claim 42, wherein an arc burns between the first and second electrodes.

52. An apparatus of claim 42, wherein the welding torch produces additional electric arcs by additional electrodes and further wherein the at least one focused laser beam, the first electric arc, the second electric arc, and the additional electric arcs all simultaneously weld the workpiece in a single interaction zone of plasma and molten metal.

* * * * *